United States Patent
Ghai et al.

(10) Patent No.: US 9,390,024 B2
(45) Date of Patent: *Jul. 12, 2016

(54) BYPASSING A STORE-CONDITIONAL REQUEST AROUND A STORE QUEUE

(71) Applicant: INTERNATIONAL BUSINESS MACHINES CORPORATION, Armonk, NY (US)

(72) Inventors: Sanjeev Ghai, Round Rock, TX (US); Guy L Guthrie, Austin, TX (US); Hugh Shen, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/311,447

(22) Filed: Jun. 23, 2014

(65) Prior Publication Data
US 2015/0161054 A1    Jun. 11, 2015

Related U.S. Application Data

(63) Continuation of application No. 14/100,356, filed on Dec. 9, 2013.

(51) Int. Cl.
| | |
|---|---|
| *G06F 12/00* | (2006.01) |
| *G06F 12/08* | (2016.01) |
| *G06F 12/12* | (2016.01) |
| G06F 13/00 | (2006.01) |
| G06F 13/28 | (2006.01) |
| G06F 9/38 | (2006.01) |

(52) U.S. Cl.
CPC ........ *G06F 12/0888* (2013.01); *G06F 12/0811* (2013.01); *G06F 12/0833* (2013.01); *G06F 12/0895* (2013.01); *G06F 12/128* (2013.01); *G06F 9/3836* (2013.01); *G06F 12/0815* (2013.01)

(58) Field of Classification Search
CPC ............ G06F 12/0888; G06F 12/0811; G06F 12/0815; G06F 9/3836; G06F 12/0833; G06F 12/128
USPC ....................................................... 711/122
See application file for complete search history.

(56) References Cited

U.S. PATENT DOCUMENTS

| | | |
|---|---|---|
| 6,360,314 B1 | 3/2002 | Webb, Jr. et al. |
| 7,010,654 B2 | 3/2006 | Blackmon et al. |
| 7,360,041 B2 | 4/2008 | Guthrie et al. |
| 7,533,227 B2 | 5/2009 | Guthrie et al. |
| 7,594,100 B2 | 9/2009 | Cypher et al. |
| 8,127,057 B2 | 2/2012 | Chung et al. |
| 2008/0082794 A1 | 4/2008 | Yu et al. |

OTHER PUBLICATIONS

Ghai, Sanjeev, "Bypassing a Store Conditional Request Around a Store Queue", U.S. Appl. No. 14/100,356 Notice of Allowance dated Jul. 8, 2015.

*Primary Examiner* — Mark Giardino, Jr.
(74) *Attorney, Agent, or Firm* — Russell Ng PLLC; Steven L. Bennett

(57) ABSTRACT

In response to receipt of a store-conditional (STCX) request of a processor core, the STCX request is buffered in an entry of a store queue for eventual service by a read-claim (RC) machine by reference to a cache array, and the STCX request is concurrently transmitted via a bypass path bypassing the store queue. In response to dispatch logic dispatching the STCX request transmitted via the bypass path to the RC machine for service by reference to the cache array, the entry of the STCX request in the store queue is updated to prohibit selection of the STCX request in the store queue for service. In response to the STCX request transmitted via the bypass path not being dispatched by the dispatch logic, the STCX is thereafter transmitted from the store queue to the dispatch logic and dispatched to the RC machine for service by reference to the cache array.

6 Claims, 6 Drawing Sheets

US 9,390,024 B2

BYPASSING A STORE-CONDITIONAL REQUEST AROUND A STORE QUEUE

PRIORITY CLAIM

This application is a continuation of U.S. patent application Ser. No. 14/100,356 entitled "BYPASSING A STORE-CONDITIONAL REQUEST AROUND A STORE QUEUE," filed on Dec. 9, 2013, the disclosure of which is incorporated herein by reference in its entirety for all purposes.

BACKGROUND OF THE INVENTION

The present invention relates in general to data processing and more specifically to store-conditional operations within a data processing system. Still more particularly, the present invention relates to accelerating a store-conditional operation by bypassing the store-conditional operation around a store queue.

In a multiprocessor (MP) computer system, processors often need to update certain shared memory locations of the MP system in a synchronized fashion. Traditionally, this synchronization has been achieved by a thread of a processor core updating a shared memory location utilizing an atomic "read-modify-write" operation that reads, modifies, and then writes the specific memory location in an atomic fashion. Examples of such operations are the well known "compare-and-swap" and "test-and-set" operations.

In some conventional processors, a read-modify-write operation is implemented using a pair of instructions rather than a single instruction, where such instructions are referred to herein as load-and-reserve (LARX) and store-conditional (STCX) instructions. LARX and STCX instructions, while not atomic primitives in themselves, implement an atomic read-modify-write of memory by monitoring for any possible updates to the shared memory location in question between performance of the LARX and STCX operations. In effect, the STCX operation only succeeds when the execution of LARX and STCX instructions produces an atomic read-modify-write update of memory.

The processing of a LARX/STCX instruction pair begins with a thread of execution executing a LARX instruction. A LARX instruction is a special load instruction that returns load data for the target memory address and further instructs the memory coherence mechanism in the MP system to establish a reservation for a "reservation granule" (e.g., cache line) containing target memory address. Once the reservation is established, the memory coherence mechanism monitors for write operations that target the reservation granule.

Once the load data is returned by the LARX instruction, the thread of execution typically, but not always, modifies the returned load data within the registers of the processor core utilizing some sequence of arithmetic, test, and branch instructions corresponding to the particular type of atomic update desired (e.g., fetch-and-increment, fetch-and-decrement, compare-and-swap, etc.).

Next, the thread of execution typically issues a STCX instruction to attempt to store the modified value back to the target memory address. The STCX instruction will succeed (and update the target memory address) only if the memory coherence mechanism has not detected any write operations to the reservation granule between the LARX operation and the STCX operation. A pass/fail indication is returned to the processor core indicating whether or not the update indicated by the STCX instruction was successful.

The thread of execution is usually stalled at the STCX instruction until the pass/fail indication for the STCX instruction is returned. Even in those cores that can execute instructions beyond a STCX that is waiting for its pass/fail indication, it is usually not possible to execute another LARX and STCX sequence because the coherence mechanism usually cannot easily track more than one reservation address per thread of execution at a time. Finally, the thread of execution typically examines the pass/fail indication of the STCX instruction and loops back to execute the LARX instruction if the pass/fail indication indicates the memory update requested by the STCX instruction failed.

In a typical implementation, a store queue is disposed between a processor core and the level of supporting cache memory at which coherence determinations are made (e.g., a store-in level two (L2) cache). The store queue includes a number of entries that are used to buffer regular store requests generated by the various threads of the processor core through execution of store instructions, as well as STCX requests generated by the processor core through execution of STCX instructions. The present disclosure recognizes that, in general, the probability that any given STCX request will fail increases the longer the STCX request remains in the store queue. Further, the present disclosure recognizes that, in general, the duration of pendency of a STCX request increases as the number of threads of execution supported by a common store queue (and hence the potential number of store and STCX operations in-flight) increases.

BRIEF SUMMARY

In at least one embodiment, in response to receipt of a store-conditional (STCX) request of a processor core, the STCX request is buffered in an entry of a store queue for eventual service by a read-claim (RC) machine by reference to a cache array, and the STCX request is concurrently transmitted via a bypass path bypassing the store queue. In response to dispatch logic dispatching the STCX request transmitted via the bypass path to the RC machine for service by reference to the cache array, the entry of the STCX request in the store queue is updated to prohibit selection of the STCX request in the store queue for service. In response to the STCX request transmitted via the bypass path not being dispatched by the dispatch logic, the STCX is thereafter transmitted from the store queue to the dispatch logic and dispatched to the RC machine for service by reference to the cache array.

DETAILED DESCRIPTION

Figure 1:
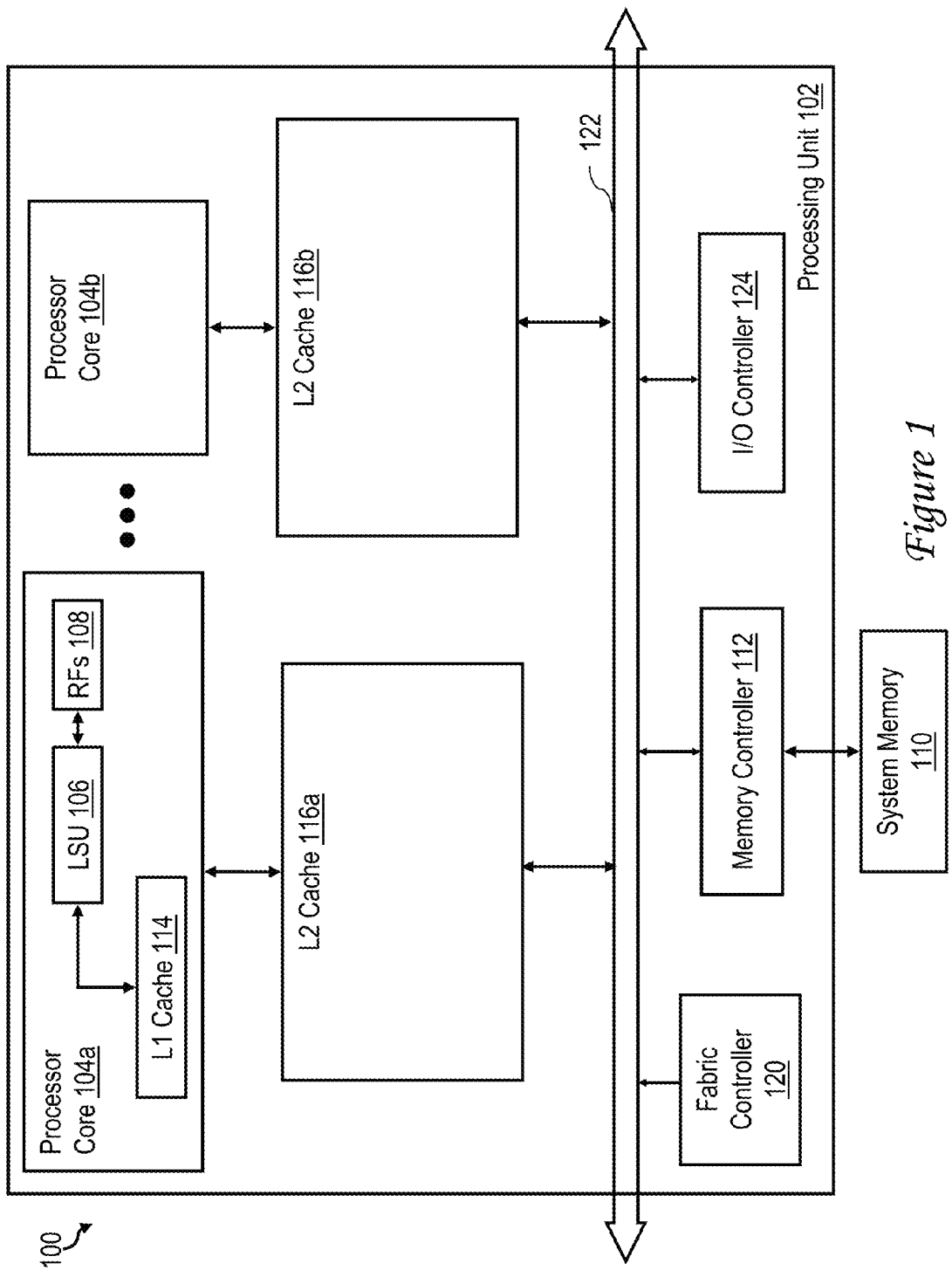
FIG. 1 is a high level block diagram of a multiprocessor data processing system within which the various features disclosed herein may advantageously be implemented.

With reference now the figures and in particular to FIG. 1, there is illustrated an exemplary multiprocessor data processing system 100 in accordance with one embodiment. In the depicted embodiment, data processing system 100 includes one or more processing units 102, each of which is implemented as an integrated circuit including two or more processor cores 104a, 104b for processing instructions and data. In a preferred embodiment, each processor core 104 is capable of independently executing multiple hardware threads of execution simultaneously. As depicted, each processor core 104 includes one or more execution units, such as load-store unit (LSU) 106, for executing instructions. The instructions executed by LSU 106 include memory access instructions (including LARX and STCX instructions) that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 108, and memory blocks updated by store accesses are written to the distributed shared memory system from the one or more register files 108.

The operation of each processor core 104 is supported by a multi-level volatile memory hierarchy having at its lowest level a shared system memory 110 accessed via an integrated memory controller 112, and at its upper levels, one or more levels of cache memory, which in the illustrative embodiment include a store-through level one (L1) cache 114 within and private to each processor core 200, and a respective store-in level two (L2) cache 116a, 116b for each processor core 104a, 104b.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 120 responsible for controlling the flow of operations on the system fabric 122 utilized to couple processing units 102 and for implementing the coherency communication required to implement the selected cache coherency protocol (e.g., the MESI coherency protocol or a variant thereof). Processing unit 104 further includes an integrated I/O (input/output) controller 124 supporting the attachment of one or more I/O devices (not depicted).

In operation, when a hardware thread under execution by a processor core 104 includes a memory access instruction requesting a specified memory access operation to be performed, LSU 106 executes the memory access instruction to determine the target address (e.g., an effective address) of the memory access request. After translation of the target address to a real address, L1 cache 114 is accessed utilizing the target address. Assuming the indicated memory access cannot be satisfied solely by reference to L1 cache 114 (which is the case for LARX and STCX requests), LSU 106 then transmits the memory access request, which includes at least a transaction type (ttype) (e.g., load, LARX, store or STCX) and the target real address, to its affiliated L2 cache 116 for servicing.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. There are four general ordering cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 that implements a weak consistency memory model, so called "barrier" (e.g., SYNC) instructions are typically provided to allow the programmer to specify what memory access operation orderings and atomicity are to be applied during execution of the multiprocessor program. Hereafter, it will be assumed that data processing system 100 implements a weak consistency memory model.

Figure 2:
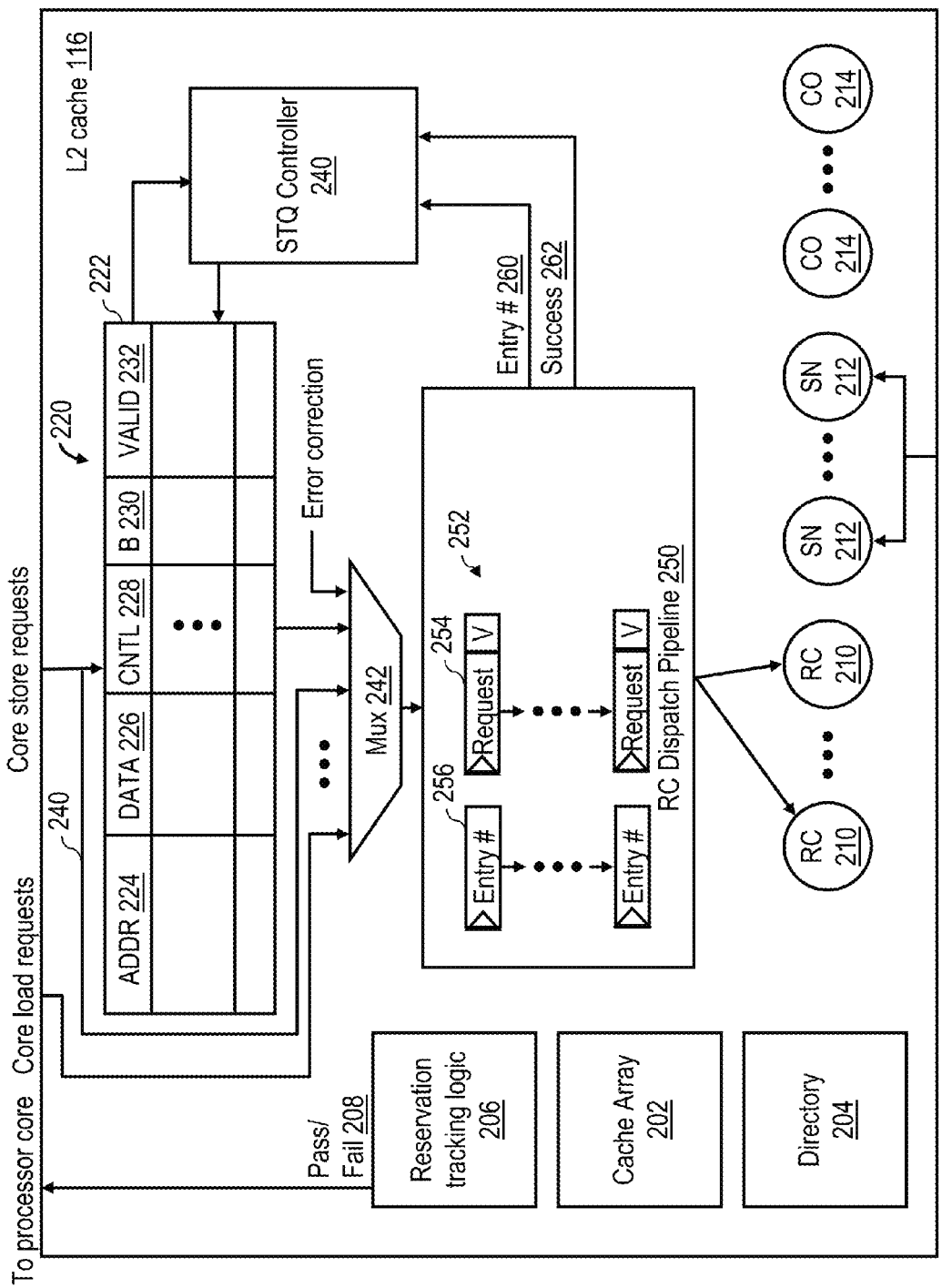
FIG. 2 is a high level block diagram of an exemplary lower level cache memory including a store queue mechanism that supports bypass of STCX requests in accordance with one embodiment.

Referring now to FIG. 2, there is depicted a more detailed block diagram of an exemplary embodiment of a lower level cache (e.g., an L2 cache 116) that supports bypass of STCX requests around a store queue in accordance with one embodiment. As shown in FIG. 2, L2 cache 116 includes a cache array 202 and a directory 204 of the contents of cache array 202. Assuming cache array 202 and directory 204 are set-associative as is conventional, memory locations in system memories 110 are mapped to particular congruence classes within cache array 202 utilizing predetermined index bits within the system memory (real) addresses. The particular memory blocks stored within the cache lines of cache array 202 are recorded in cache directory 204, which contains one directory entry for each cache line. While not expressly depicted in FIG. 2, it will be understood by those skilled in the art that each directory entry in cache directory 204 includes various fields, for example, a tag field that identifies the real address of the memory block held in the corresponding cache line of cache array 202, a state field that indicate the coherency state of the cache line, and inclusivity bits indicating whether the memory block is held in the associated L1 cache 114. The information in cache directory 204 typically further includes replacement order information that indicates a relative replacement order of the entries in each congruence class.

L2 cache 116 includes multiple (e.g., 16) Read-Claim (RC) machines 210 for independently and concurrently servicing load and store requests (including LARX and STCX requests) received from the affiliated processor core 104. In order to service remote memory access requests originating from processor cores 104 other than the affiliated processor core 104, L2 cache 116 also includes multiple snoop machines 212. Each snoop machine 212 can independently and concurrently handle a remote memory access request "snooped" from system fabric 122. As will be appreciated, the servicing of memory access requests by RC machines 210 may require the replacement or invalidation of memory blocks within cache array 202. Accordingly, L2 cache 116 also includes CO (castout) machines 214 that manage the removal and writeback of memory blocks from cache array 202.

L2 cache 116 further includes a store queue (STQ) 220 for buffering store and STCX requests received by L2 cache 116 from the affiliated processor core 104. In the depicted exemplary embodiment, STQ 220 includes multiple entries 222, each including a number of fields. These fields can include an address field 224 identifying the target memory address of a store or STCX request, a data field 226 that buffers store data to be stored to the target memory address, a control field 228 that distinguishes between STCX and store requests and may additionally specify prioritization or other information, a bypass field 230 indicating whether or not the entry corresponds to a SCTX request that has been permitted to bypass STQ 220, and a valid field 232 indicating whether the entry 222 is valid.

L2 cache 116 additionally includes selection logic (e.g., a request multiplexer 242) having multiple inputs that each receives a respective one of multiple different types of requests that can be serviced by RC machines 210. Multiplexer 242 selects among the various requests presented at its inputs (or for some cycles, selects not to choose a request) for processing by dispatch logic (e.g., an RC dispatch pipeline 250) from which the requests are dispatched to RC machines 210 for service. The requests from which request multiplexer 242 selects can include, for example, a store or STCX request selected from STQ 220 by a STQ controller 240, a bypass STCX request of the affiliated processor core 104 received via a bypass path 240 that bypasses STQ 220 (bypass STCX requests transmitted via bypass path 240 are also buffered in STQ 220), load requests of the affiliated processor core 104, and error correction requests (which may arise from directory or other errors detected via ECC). Request multiplexer 242 selects among the various requests presented at its requests based on a priority that in descending priority order generally favors error correction requests, bypass STCX requests, load requests, and finally store and STCX requests from STQ 220. In order to avoid livelocks arising from operational harmonics, this priority ordering is preferably occasionally (e.g., pseudo-randomly) varied, for example, based on a linear feedback shift register (LFSR) input.

RC dispatch pipeline 250 preferably is implemented as a fixed duration pipeline comprising multiple pipeline stages 252 (e.g., four stages) at which each of multiple overlapping requests can be sequentially processed for a predetermined number of clock cycles (e.g., 4 cycles). In the illustrated example, each pipeline stage 252 includes a request latch 254 for buffering a request and associated valid bit and a entry number latch 256 that, for store and STCX requests, can indicate a corresponding STQ entry 222 that buffers the request held in that pipeline stage 252. The processing performed while requests proceed through RC dispatch pipeline 250 can include, for example, accessing directory 204 to make a hit/miss determinations for the target memory addresses of the requests, initiating accesses to cache array 202, and error checking.

At the last cycle of the processing of a request within RC dispatch pipeline 250, dispatch pipeline 250 makes a dispatch determination based upon a number of criteria, including, for example, (1) the presence of an address collision between the request address and a previous request address currently being processed by a castout machine 214, snoop machine 212 or RC machine 210, (2) directory information for the request's memory address, and (3) availability of an idle RC machine 210 to service the request. If RC dispatch pipeline 250 makes a determination that the request is to be dispatched, the memory access request is dispatched from RC dispatch pipeline 250 to an RC machine 210. If, however, the request fails dispatch, the failure is signaled to the requestor (e.g., STQ 220, another requestor within L2 cache 116, or a local or remote processor core 104) by a retry response. The requestor may subsequently retry the failed request, if necessary.

In order to track reservations of the threads of the affiliated processor core 104, L2 cache 116 additionally includes reservation tracking logic 206. Reservation tracking logic 206 records a reservation for a reservation granule in response to a LARX request from the affiliated processor core 104. While the reservation is pending, reservation tracking logic 206 monitors for any request to update the reservation granule and cancels the reservation in response to detecting any such update request while the reservation is pending. In response to an RC machine 210 servicing a STCX request of the affiliated processor core 104, reservation tracking logic 206 provides the affiliated processor core 104 with a pass/fail indicator 208 indicating whether or not a reservation was pending for the reservation granule corresponding to the target memory address of the STCX request when the STCX request was processed by L2 cache 116. The probability that pass/fail indicator 208 will provide a pass indication to the affiliated processor core 104 is increased by decreasing the duration of pendency of STCX requests by permitting STCX requests to opportunistically bypass STQ 220, as described further below.

Figure 3:
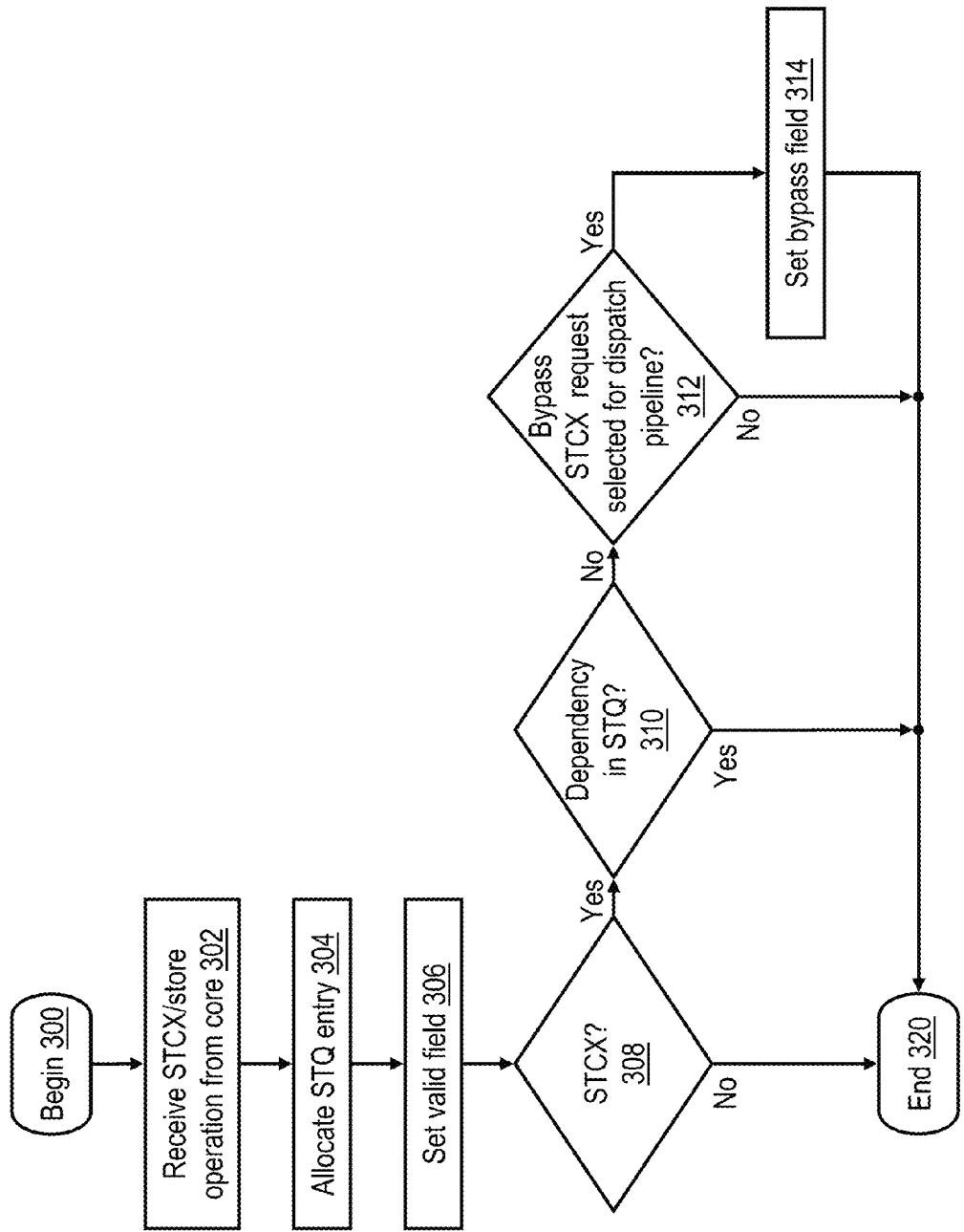
FIG. 3 is a high level logical flowchart of an exemplary process of allocating store queue entries in accordance with one embodiment.

With reference now to FIG. 3, there is illustrated a high level logical flowchart of an exemplary process of allocating store queue entries in accordance with one embodiment. As with the other logical flowcharts presented herein, steps are presented in a logical rather than strictly chronological order, and in at least some embodiments some steps can be performed in a different order than illustrated or concurrently.

The allocation process depicted in FIG. 3 begins at block 300 and proceeds to step 302, which depicts L2 cache 116 receiving a store or STCX request from the affiliated processor core 104. (STCX requests are concurrently presented to request multiplexer 242 via bypass path 240.) In response to receipt of the store or STCX request, STQ 220 allocates a STQ entry 222 to buffer the store or STCX request (block 304). In allocating the STQ entry 222, address field 224, data field 226, and control field 228 are set appropriately. In addition, at block 306, STQ 220 sets the valid field 232 of the allocated STQ entry 222 to signify that it is valid.

At block 308, STQ 220 further determines whether the request for which a STQ entry 222 was allocated is a STCX request. If not, the allocation process given in FIG. 3 simply ends at block 320. Otherwise, in response to a determination that the request is a STCX request, STQ 220 determines at block 310 whether or not the STCX request has a dependency on another request in STQ 220, for example, an older barrier (e.g., SYNC) operation that orders memory access requests between threads or another store or STCX request that targets the same memory address. In response to a determination at block 310 that the STCX request has a dependency on another request buffered in STQ 220, the allocation process of FIG. 3 ends at block 320. If, however, STQ 220 determines at block 310 that the STCX request does not have any dependency on another request in STQ 220, STQ 220 further determines at block 312 whether the STCX request, which was also transmitted to request multiplexer 242 as a bypass STCX request, was successful in bypassing STQ 220, that is, was selected by request multiplexer 242 for insertion into dispatch pipeline 250. While request multiplexer 242 preferably generally selects a bypass STCX request over requests in STQ 220 and load requests of the affiliated processor core 104, there are a number of reasons that a bypass STCX request may not be selected by request multiplexer 242 for insertion into dispatch pipeline 250. For example, request multiplexer 242 may not select a bypass STCX request based on the presence of a error correction request or a conflicting snooped request being serviced by a snoop machine 212 or in response to a priority randomization input (e.g., provided by an LFSR).

In response to a determination at block 312 that the bypass STCX request was not selected by request multiplexer 242 for insertion into dispatch pipeline 250, the allocation process shown in FIG. 3 ends at block 320. However, in response to a determination at block 312 that the bypass STCX request was selected for insertion into dispatch pipeline 250, STQ controller 240 sets the bypass field 230 of the relevant STQ entry 222 to indicate that bypass was successful (block 314). Thereafter, the process of FIG. 3 ends at block 320.

Figure 4:
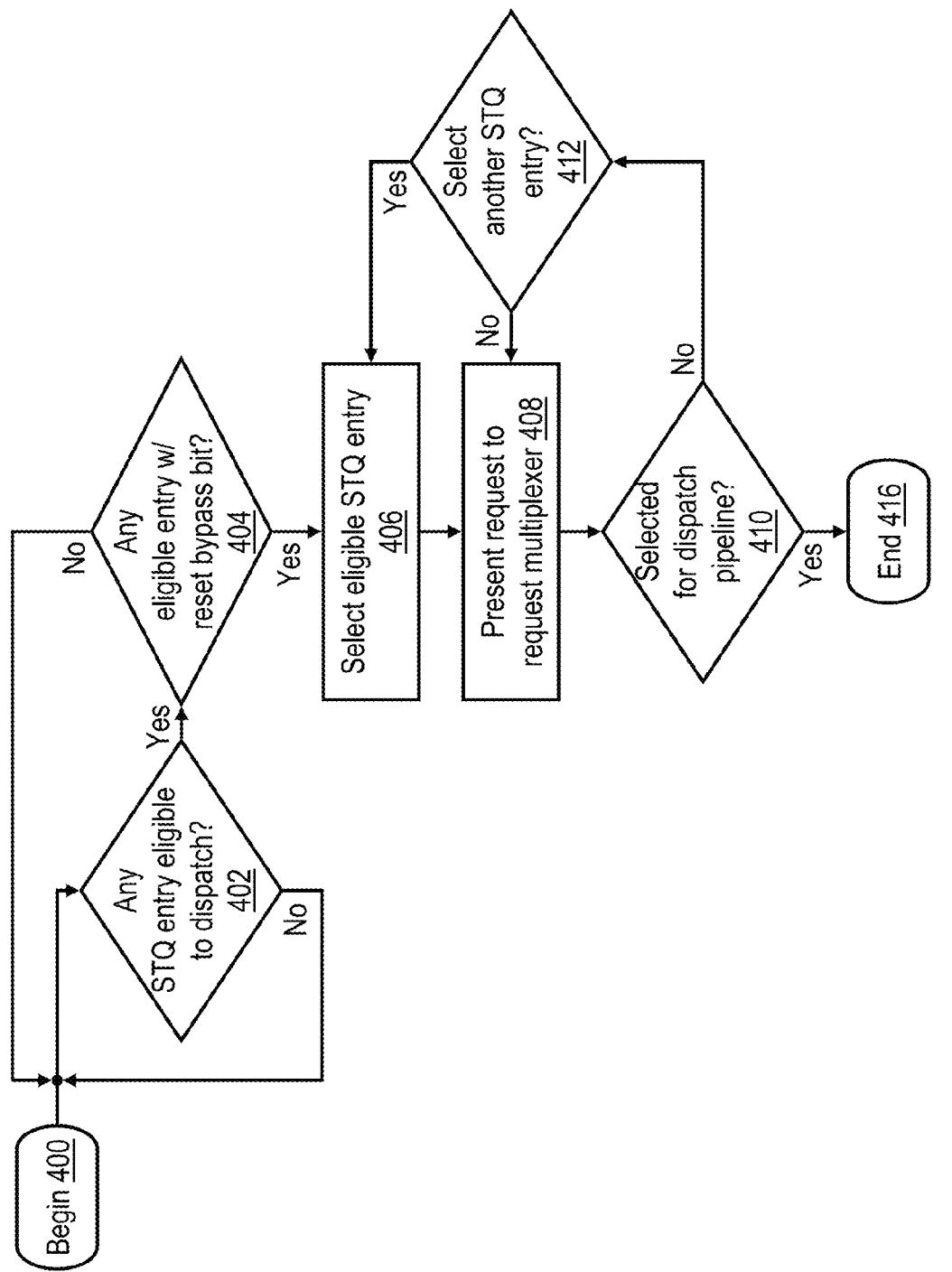
FIG. 4 is a high level logical flowchart of an exemplary process of selecting a request from a store queue for possible insertion into a dispatch pipeline in accordance with one embodiment.

Referring now to FIG. 4, there is depicted a high level logical flowchart of an exemplary process of selecting a request from a store queue for possible insertion into a dispatch pipeline in accordance with one embodiment. The process begins at block 400 and proceeds to block 402, which illustrates STQ controller 240 determining whether or not STQ 220 contains any STQ entry or entries 222 that are eligible to dispatch (i.e., STQ entries 222 with their valid field 232 set). STQ controller 240 additionally determines at block 404 if any of the eligible STQ entries 222 have a reset bypass field 230, indicating that no corresponding request is presently being processed within RC dispatch pipeline 250. If no STQ entry 222 within STQ 220 satisfies both of the qualifications illustrated at blocks 402 and 404, the process of FIG. 4 returns to block 402, which has been described.

However, in response to determining that STQ 220 contains at least one STQ entry 222 that is both eligible for dispatch and has a reset bypass field 230, STQ controller 240 determines at block 406 which, if any, of the store or STCX requests buffered by the qualified STQ entries 222 is to be selected for presentation to request multiplexer 242 and then presents the selected store or STCX request to request multiplexer 242 for possible selection for insertion into RC dispatch pipeline 250 (block 408). STQ controller 240 then determines at block 410 whether or not the store or STCX request presented to request multiplexer 242 was selected for insertion into RC dispatch pipeline 250. If not, STQ controller 240 determines at block 412 whether to select a different eligible STQ entry 222 from STQ 220 or to retain its currently selected STQ entry 222. In response to STQ controller 240 determining to select a different eligible STQ entry 222, the process passes from block 412 to block 406, and otherwise, returns to block 408. Following a determination at block 410 that the store or STCX request presented to request multiplexer 242 was selected for insertion into RC dispatch pipeline 250, the process of FIG. 4 ends at block 416.

Figure 5:
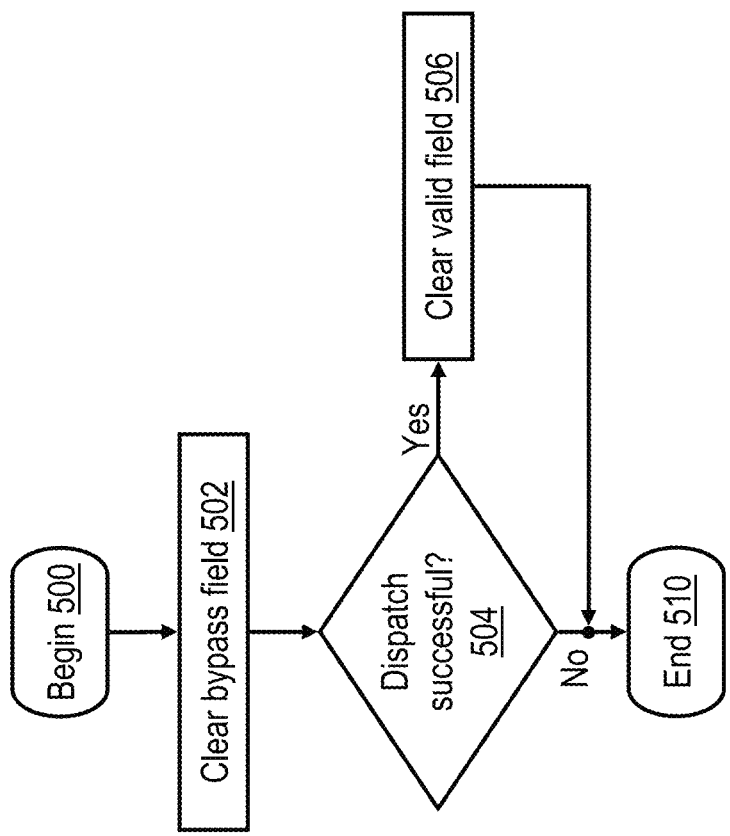
FIG. 5 is a high level logical flowchart of an exemplary process of updating a store queue entry to reflect whether or not a STCX request successfully dispatched in accordance with one embodiment.

With reference now to FIG. 5, there is illustrated a high level logical flowchart of an exemplary process of updating a STQ entry 222 to reflect whether or not a STCX request successfully dispatched from RC dispatch pipeline 250 in accordance with one embodiment. The process of FIG. 5 is performed each time a STCX request reaches the final pipeline stage 252 of dispatch pipeline 250 and consequently either dispatches successfully or fails dispatch.

The illustrated process begins at block 500 in response to STQ controller 240 receiving from dispatch pipeline 250 a STQ entry number 260 and a success indication 262 for a STCX request in the final pipeline stage 252 of dispatch pipeline 250. In response to receipt of these inputs, STQ controller 240 clears the bypass field 230 of the identified STQ entry 222 (if necessary), as shown at block 502. Thus, in the illustrated embodiment a STCX request has only one opportunity to bypass STQ 220 (of course, in other embodiments, additional opportunities for bypass could be allowed). Clearing the bypass field 230 at block 502 also ensures that a STCX request that bypassed STQ 220 but failed dispatch is made eligible for selection by STQ controller 240 for presentation to request multiplexer 242, if necessary (see, e.g., block 402 of FIG. 4 described above). At blocks 504 and 506, STQ controller 240 also clears the valid field 232 of the identified STQ entry 222 (i.e., invalidates the STQ entry 222) if dispatch of the request was successful in order to ensure that the bypass STCX request that successfully dispatched from RC dispatch pipeline 250 is not serviced more than once. Following either block 504 or block 506, the process shown in FIG. 5 ends at block 510.

Figure 6:
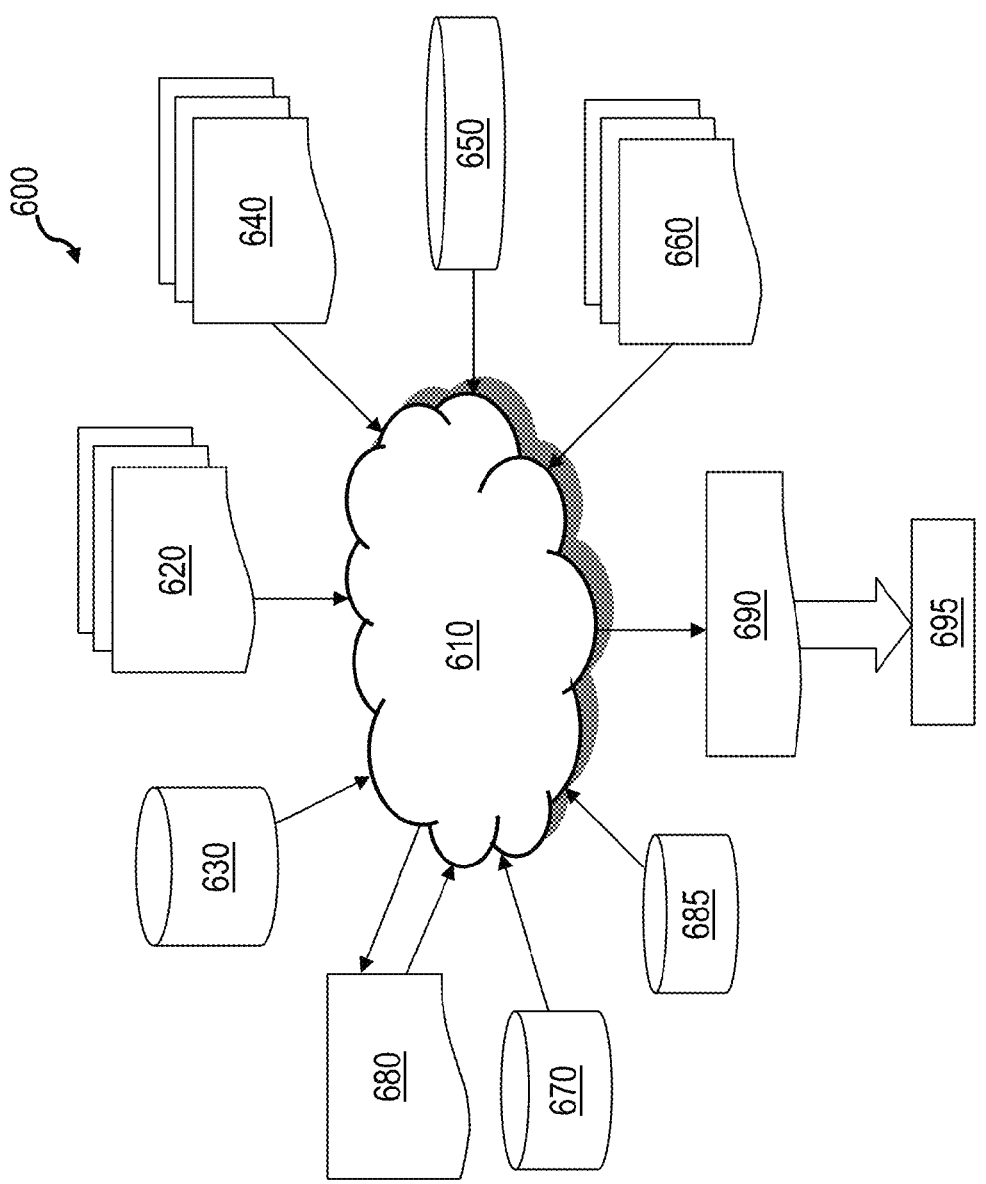
FIG. 6 is a data flow diagram of an exemplary design process.

Referring now to FIG. 6, there is depicted a block diagram of an exemplary design flow 600 used for example, in semiconductor IC logic design, simulation, test, layout, and manufacture. Design flow 600 includes processes, machines and/or mechanisms for processing design structures or devices to generate logically or otherwise functionally equivalent representations of the design structures and/or devices described above and shown in FIGS. 1-2. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 620 that is preferably processed by a design process 610. Design structure 620 may be a logical simulation design structure generated and processed by design process 610 to produce a logically equivalent functional representation of a hardware device. Design structure 620 may also or alternatively comprise data and/or program instructions that when processed by design process 610, generate a functional representation of the physical structure of a hardware device. Whether representing functional and/or structural design features, design structure 620 may be generated using electronic computer-aided design (ECAD) such as implemented by a core developer/designer. When encoded on a machine-readable data transmission, gate array, or storage device, design structure 620 may be accessed and processed by one or more hardware and/or software modules within design process 610 to simulate or otherwise functionally represent an electronic component, circuit, electronic or logic module, apparatus, device, or system such as those shown in FIGS. 1-2. As such, design structure 620 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 610 preferably employs and incorporates hardware and/or software modules for synthesizing, translating, or otherwise processing a design/simulation functional equivalent of the components, circuits, devices, or logic structures shown in FIGS. 1-2 to generate a netlist 680 which may contain design structures such as design structure 620. Netlist 680 may comprise, for example, compiled or otherwise processed data structures representing a list of wires, discrete components, logic gates, control circuits, I/O devices, models, etc. that describes the connections to other elements and circuits in an integrated circuit design. Netlist 680 may be synthesized using an iterative process in which netlist 680 is resynthesized one or more times depending on design specifications and parameters for the device. As with other design structure types described herein, netlist 680 may be recorded on a machine-readable storage device or programmed into a programmable gate array. The device may be a non-volatile storage device such as a magnetic or optical disk drive, a programmable gate array, a compact flash, or other flash memory. Additionally, or in the alternative, the storage device may be a system or cache memory, or buffer space.

Design process 610 may include hardware and software modules for processing a variety of input data structure types including netlist 680. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 685 which may include input test patterns, output test results, and other testing information. Design process 610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 610 without deviating from the scope and spirit of the invention. Design process 610 may also include modules for performing standard circuit design processes such as timing analysis, verification, design rule checking, place and route operations, etc.

Design process 610 employs and incorporates logic and physical design tools such as HDL compilers and simulation model build tools to process design structure 620 together with some or all of the depicted supporting data structures along with any additional mechanical design or data (if applicable), to generate a second design structure 690. Design structure 690 resides on a storage device or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 620, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2. In one embodiment, design structure 690 may comprise a compiled, executable HDL simulation model that functionally simulates the devices shown in FIGS. 1-2.

Design structure 690 may also employ a data format used for the exchange of layout data of integrated circuits and/or symbolic data format (e.g., information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2. Design structure 690 may then proceed to a stage 695 where, for example, design structure 690: proceeds to tape-out, is released to manufacturing, is released to a mask house, is sent to another design house, is sent back to the customer, etc.

As has been described, in at least one embodiment, a data processing system includes a processor core, store queue, dispatch logic, a read-claim (RC) machine and a cache array. In response to receipt of a store-conditional (STCX) request of the processor core, the STCX request is buffered in an entry of the store queue for eventual service by the RC machine by reference to a cache array, and the STCX request is concurrently transmitted via a bypass path bypassing the store queue. In response to dispatch logic dispatching the STCX request transmitted via the bypass path to the RC machine for service by reference to the cache array, the entry of the STCX request in the store queue is updated to prohibit selection of the STCX request in the store queue for service. In response to the STCX request transmitted via the bypass path not being dispatched by the dispatch logic, the STCX is thereafter transmitted from the store queue to the dispatch logic and dispatched to the RC machine for service by reference to the cache array.

While the invention has been particularly shown and described with reference to a preferred embodiment, it will be understood by those skilled in the art that various changes in form and detail may be made therein without departing from the spirit and scope of the invention. The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. As employed herein, a "storage device" is specifically defined to include only statutory articles of manufacture and to exclude transitory propagating media per se. Further, the term "coupled" is defined to include not only direct connection of elements, but connection through one or more intervening elements. Lastly, the use of a singular term, such as, but not limited to, "a," is not intended as limiting of the number of items.

What is claimed is:

1. A method of data processing in a data processing system having a processor core, store queue, dispatch logic, a read-claim (RC) machine and a cache array, the method comprising:

in response to receipt of a store-conditional (STCX) request of the processor core:

buffering the STCX request in an entry of the store queue for eventual service by the RC machine by reference to the cache array;

concurrently transmitting the STCX request via a bypass path bypassing the store queue; and in response to the dispatch logic dispatching the STCX request transmitted via the bypass path to the RC machine for service by reference to the cache array, updating the entry of the STCX request in the store queue to prohibit selection of the STCX request in the store queue for service; and in response to the STCX request transmitted via the bypass path not being dispatched by the dispatch logic, thereafter transmitting the STCX from the store queue to the dispatch logic and dispatching the STCX to the RC machine for service by reference to the cache array.

2. The method of claim 1, and further comprising:

selection logic receiving as inputs the STCX request transmitted via the bypass path, a selected request among a plurality of requests buffered in the store queue, and a load request received from the processor core and selecting, from among the requests received as inputs, a request to be processed by the dispatch logic, wherein the selecting includes the selection logic preferentially selecting STCX requests transmitted via the bypass path.

3. The method of claim 2, and further comprising a store queue controller selecting the selected request among the plurality of requests and presenting the selected request to the selection logic for possible selection for processing by the dispatch logic.

4. The method of claim 2, and further comprising:

the STCX request transmitted via the bypass path not being dispatched in response to the selection logic selecting another request other than the STCX request transmitted via the bypass path for processing by the dispatch logic.

5. The method of claim 1, wherein the updating includes invalidating the entry.

6. The method of claim 1, and further comprising:

in response to the STCX request transmitted via the bypass path not being dispatched by the dispatch logic, updating the entry of the STCX request in the store queue to make the STCX request in the store queue eligible for selection for processing by the dispatch logic, wherein the transmitting the STCX request from the store queue is performed only after the updating of the STCX request in the store queue to make the STCX request in the store queue eligible for selection for processing by the dispatch logic.

* * * * *